Nov. 15, 1955  E. M. GREENBERG  2,723,666
LAMINATED MITTEN FOR SURGICAL AND OBSTETRICAL INSTRUMENTS
Filed Aug. 12, 1954
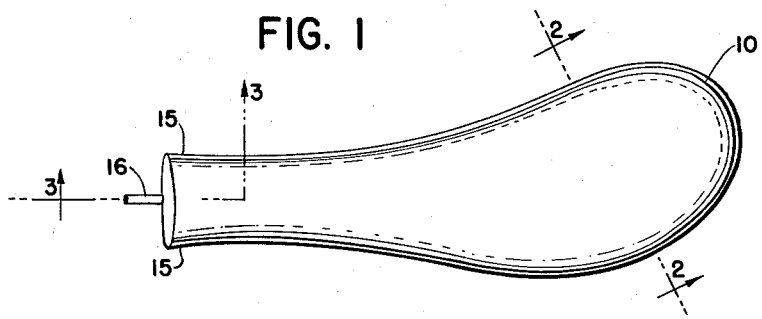
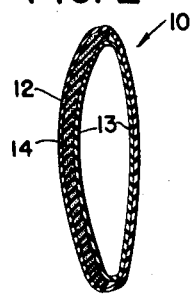 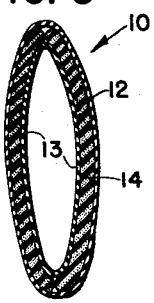 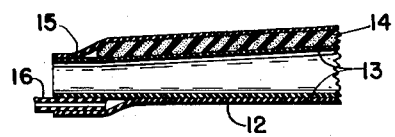
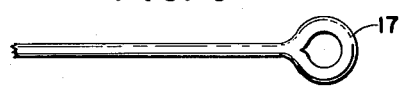
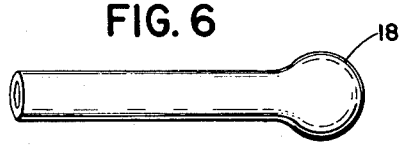
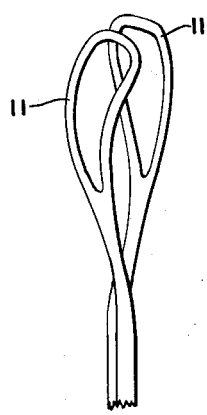
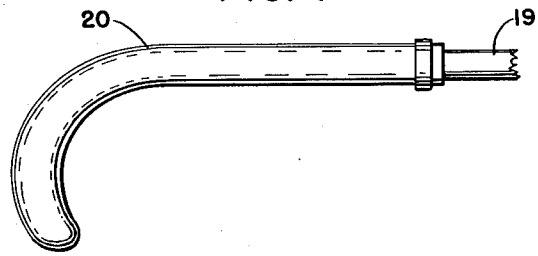
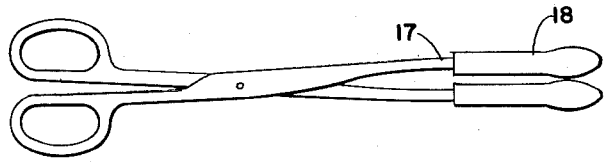
EMANUEL M. GREENBERG
INVENTOR
BY Ralph E. Bitner
ATTORNEY

United States Patent Office 2,723,666
Patented Nov. 15, 1955

2,723,666

LAMINATED MITTEN FOR SURGICAL AND OBSTETRICAL INSTRUMENTS

Emanuel M. Greenberg, New York, N. Y.

Application August 12, 1954, Serial No. 449,448

4 Claims. (Cl. 128—321)

This invention relates to improvements in covering materials for surgical instruments and obstetrical forceps and has particular reference to the construction of rubber laminated coverings which may be washed, sterilized, and reused many times.

The mittens described herein are an improvement over the devices described in U. S. Patent 2,637,320, issued May 5, 1953 to E. M. Greenberg. These mittens used an inflatable rubber sleeve which was pulled over a steel blade and then inflated with air pressure to provide a soft resilient surface with which to handle sensitive sections of the human body. The present invention employs a laminated structure comprising an outer membrane envelope of solid flexible rubber or plastic, an inner section of foam or sponge rubber or rubber-like material, and a second envelope of thin flexible rubber. The improved mittens can be washed easily and can be sterilized in an autoclave. Because of the use of foam rubber, inflation is not always necessary and because of the covering of thin flexible rubber sheeting, particles of dirt can not be imbedded in the rough surface generally found on most foam rubber articles.

One of the objects of this invention is to provide an improved mitten for general surgical instruments which avoids one or more of the disadvantages and limitations of prior art coverings.

Another object of the invention is to enclose the blades of steel surgical instruments in a soft covering so that surgical operations may be performed without trauma, bruises, or abrasions in tissues of the body wall such as skin, subcutaneus tissue and fat, muscles, and peritoneum. These coverings also prevent bruises to the baby's head during obstetrical delivery.

Another object of the invention is to provide a mitten for the prongs or blades of surgical and obstetrical instruments which can easily be cleaned and sterilized on the interior as well as the exterior.

One feature of the invention includes a mitten for surgical instruments having an outer envelope of thin flexible rubber and an inner envelope of the same material. Sandwiched between these two envelopes is a layer of foam rubber. The two envelopes are open at one end only so that each forms a bag-like structure. The open ends of the bags are constricted to form a neck. The edges around the open ends are cemented together so as to hermetically seal the foam rubber from the outside air. This mitten is pulled over the metallic prongs or blades of surgical instruments and is used in handling delicate organs of the body such as the appendix, intestines, etc. in surgical operations and the baby's head in obstetrical operations.

For a better understanding of the present invention, together with other and further objects thereof, reference is made to the following description taken in connection with the accompanying drawings.

Fig. 1 is a side view of a mitten.

Fig. 2 is a sectional drawing of the mitten shown in Fig. 1 taken along line 2—2 of Fig. 1.

Fig. 3 is a sectional view similar to Fig. 2 but having an alternate construction which employs double the amount of foam rubber.

Fig. 4 is a sectional drawing taken along line 3—3 of Fig. 1 and indicates the manner of sealing the two envelopes together and the installation of an optical small tube for pressure equalization.

Fig. 5 is a side view of the end of a surgical instrument which may be used with a rubber mitten.

Fig. 6 is a side view of a rubber mitten suitable for the instrument shown in Fig. 5.

Fig. 7 illustrates a long thin rubber mitten used on a retractor type of instrument.

Fig. 8 is a side view of the obstetrical forceps blades suitable for covering with the device illustrated in Fig. 1.

Fig. 9 is a side view of a complete instrument having ends similar to the ends shown in Fig. 5.

Referring now to Figs. 1, 2, and 8 the outside envelope 10 is formed in the general shape of the instrument which it is to cover. In this case the two blades 11 of an obstetrical forceps as shown in Fig. 8 are composed of steel blades for inserting on the fetal head. Each mitten includes three components, an outer envelope 12, a smaller inner envelope 13, and an insert of form fitting foam rubber 14 held between the other two. For most applications the foam rubber is used in one side only since itse presence on both sides would not contribute to its usefulness. However, in the case of surgical clamps and other instruments it may be necessary to use a single continuous insert or a double insert of foam rubber as indicated in Fig. 3.

The two envelopes 12 and 13 are made of flexible rubber sheeting, impervious to air and liquids and having a smooth flat surface which can be cleaned easily of all foreign material. The insert of foam rubber 14 may be made of any resilient sponge rubber or plastic which contains a large number of small air spaces. The surface of this insert may be rough and pitted since no foreign material ever comes in contact with it.

When the mitten is assembled the foam rubber layer is first cemented to the smaller envelope. Then this combination is inserted into the larger envelope and the edges at the two openings are cemented by any of the well-known methods of permanently securing rubber surface. The foam rubber insert is cut so as to take up most of the area on one side of the mitten. The open ends of the envelopes are sealed together as shown in Fig. 4, the extent of the seal being continuous around the entire opening except for a small stiff rubber tube 16 which may be sealed into the envelope ends between portions 12 and 13. This opening is for pressure equalization, especially when the coverings are placed in a hot autoclave for sterilization. The hot expanding air between the two envelopes can escape by way of tube 16 and when the covering is removed and placed on a surgical instrument some of the air is allowed to return to the space between the two envelopes so that they are more flexible and easier to handle. On certain types of coverings the tube 16 may be omitted and the cemented portion will then extend completely around the envelope openings, permanently sealing the inside space between the two envelopes. If this is done care must be observed during the sealing operation so that all the excess air between the two envelopes is expelled before sealing. The small amount of air which remains adds to the general resiliency of the mitten and is desirable.

When the mitten is constructed as illustrated in Figs. 1 and 2, there results an article which contains a foam rubber insert on one side only. The mittens obviously should be placed on the surgical instrument so that the foam rubber sides make contact with the object handled. Proper placement can always be accomplished by first inspecting the mitten by probing with the fingers but it has been found that a quicker and more positive identifying means can be produced by using a colored foam rubber insert. On one such model the insert was colored green, the color showing through the thin flexible covering and identifying the soft side of the mitten by visual inspection only.

Figs. 5 and 9 show the general formation of one of the commonly used surgical instruments, a ring clamp 17, while Fig. 6 shows the general type of mitten 18 which can be pulled over the clamp 17 to afford the desired protection. Covering 18 in its most desirable form is constructed of two envelopes and a foam rubber insert, as previously described, and is cemented at the opening as indicated in Fig. 4. When this construction is followed the coverings may be used many times with a sterilization operation after each use. However, the use of very small mittens on the ends of small clamps in some applications may not require the repeat sterilization feature and in such cases the mittens are sterilized, used once, and then disposed of. In such applications simple foam rubber envelopes, molded in one piece or two pieces cemented together, may be used without the inner and outer envelopes of smooth flexible rubber.

Fig. 7 shows a steel retractor which is employed by surgeons to hold certain parts of the body away from other parts during an operation. The use of bare steel retractors often causes abrasions, tearing, and serious lacerations which are avoided by the use of the foam rubber combination 20. In present practice, during an abdominal operation, the first and second assistants pull apart the edges of an incision using rather sharp-edged bare steel retractors and a piece of intestine is often caught between the body wall and the retractor blade. Foam rubber mittens, as described above, lessen the damage which may be done to the intestines in such instances and hence make surgery safer. There is little or no tendency for the coverings shown in Figs. 1 and 6 to slip off the end of the instrument due to the constricted ends. On the other types a rubber band (not shown) may be employed to secure the covering to the end of the instrument. Also, a rubber band element may be molded in place as an integral part of the mitten neck.

While there have been described and illustrated specific embodiments of the invention, it will be obvious that various changes and modifications may be made therein without departing from the field of the invention which should be limited only by the scope of the appended claims.

I claim:

1. A mitten for surgical instruments comprising, an outer envelope of thin flexible rubber-like material, an inner envelope of thin flexible rubber-like material, and a layer of foam rubber-like material disposed between the inner and outer envelope walls, each of said envelopes formed with a single opening at the end of a constricted neck to constitute a bag-like container, the edge of the opening of the inner envelope being joined to the edge of the opening of the outer envelope, said junction including a small tube for equalizing the pressure in the space between the envelopes with the atmosphere.

2. A mitten for surgical instruments comprising, an outer envelope of thin flexible rubber, an inner envelope of thin flexible rubber, and two inserts of foam rubber disposed between the inner and outer envelope walls, said inserts positioned at opposite sides of the envelopes, each of the envelopes formed with a single opening to constitute a bag-like container, the edge of the opening of the inner opening being joined to the edge of the opening of the outer envelope.

3. A disposable mitten for surgical instruments comprising, a foam rubber envelope molded in one piece, said envelope formed with a single opening at the end of a constricted neck to constitute a bag-like container, resilient reinforcing means of flexible rubber surrounding the neck for securing the mitten to a shank of the instrument, said envelope adapted to fit over the ends of surgical instruments for operations on the living body in order to reduce tissue injury therein.

4. A disposable mitten for surgical instruments comprising, an envelope constructed of two flat pieces of foam rubber cemented together at their edges to form a bag-like container having a single opening at a constricted neck, a resilient reinforcing means of flexible rubber surrounding said neck for securing the mitten to a shank of the instrument, said envelope adapted to fit over the ends of surgical instruments for operations on the living body in order to reduce tissue injury therein.

References Cited in the file of this patent

UNITED STATES PATENTS

| | | |
|---|---|---|
| 2,324,735 | Spanel | July 20, 1943 |
| 2,539,508 | Creighton | Jan. 30, 1951 |
| 2,637,320 | Greenberg | May 5, 1953 |